United States Patent
Klass et al.

(10) Patent No.: US 6,616,748 B2
(45) Date of Patent: Sep. 9, 2003

(54) HIGH PERFORMANCE PURIFIED NATURAL ZEOLITE PIGMENT FOR PAPERMAKING AND PAPER COATING

(75) Inventors: Charles P. Klass, Radnor, PA (US); Margaret K. Joyce, Kalamazoo, MI (US)

(73) Assignee: ZO Resources, LLC, San Antonio, TX (US)

( * ) Notice: Subject to any disclaimer, the term of this patent is extended or adjusted under 35 U.S.C. 154(b) by 0 days.

(21) Appl. No.: 09/922,147

(22) Filed: Aug. 3, 2001

(65) Prior Publication Data

US 2003/0051637 A1 Mar. 20, 2003

(51) Int. Cl.$^7$ .............................................. C04B 14/00
(52) U.S. Cl. ........................ 106/483; 706/626; 423/700
(58) Field of Search ................................ 706/626, 483; 423/700

(56) References Cited

U.S. PATENT DOCUMENTS

| | | |
|---|---|---|
| 4,510,254 A | 4/1985 | Morris et al. |
| 5,475,080 A | 12/1995 | Gruber |
| 5,676,909 A | 10/1997 | Hollinger, Jr. |
| 5,693,384 A | 12/1997 | Hollinger, Jr. |
| 5,786,077 A | 7/1998 | McLaughlin |
| 5,814,143 A | 9/1998 | Freeman |
| 5,922,280 A | 7/1999 | Hollinger, Jr. |
| 5,997,625 A | * 12/1999 | Londo et al. ................ 106/412 |
| 6,103,370 A | 8/2000 | Onozawa |

OTHER PUBLICATIONS

Donald D. Carr, "Industrial Minerals and Rocks", 6th Edition, Society for Mining, Metallurgy, and Exploration, Inc., 1994.

Kazuo Torii, "Utilization of Natural Zeolites in Japan", Nattional Industrial Research Institute. No Date.

* cited by examiner

Primary Examiner—C. Melissa Koslow
Assistant Examiner—Shalie A. Manlove
(74) Attorney, Agent, or Firm—Gunn, Lee & Hanor, P.C.; Michelle Evans (57) ABSTRACT

A high performance purified natural zeolite pigment composition for use in papermaking and paper coating is disclosed. Use of the pigment facilitates manufacture of coated ink jet and digital printing papers with improved quality and economics. The novel zeolite pigment composition can also be used as a supplementary pigment to improve the properties of coated paper and paperboard for flexographic and water-based gravure printing. When used as filler, the novel zeolite pigment composition is readily retained and eliminates print-through in uncoated papers. The novel zeolite pigment is low in abrasion and provides improved coefficient of friction. The novel zeolite pigment is also useful as a microparticulate retention aid in papermaking and as an additive to improve the performance of deinking processes.

12 Claims, 1 Drawing Sheet

FIG. 1

HIGH PERFORMANCE PURIFIED NATURAL ZEOLITE PIGMENT FOR PAPERMAKING AND PAPER COATING

BACKGROUND OF THE INVENTION

1. Field of The Invention

Applicant's invention relates to a purified natural zeolite pigment composition for filling and/or coating paper. More particularly, the present invention relates to a purified natural zeolite pigment composition that can be used for coating paper that produces a paper that exhibits improved characteristics over existing uncoated and coated papers made with other pigments.

2. Background Information

Pigments are used in papermaking and paper coating to improve the appearance, optical properties and printability of papers. Commonly used pigments include kaolin clay, calcium carbonate, titanium dioxide, alumina trihydrate and polystyrene. These pigments are useful in manufacture of conventional printing and writing papers and paperboards that are printed or imaged by common processes including offset lithography, gravure and xerography. Recently developed imaging technology has created needs for new types of coated and uncoated papers with properties not achievable with conventional pigments. Ink jet printing is a useful example.

Ink jet printing technology has undergone several changes in addressing the demands of existing and future digital printing applications that require high quality printed images. High quality ink jet printing typically occurs on coated paper; therefore, to produce such high quality printed images the coating composition and the ink formulation must be considered.

Current ink jet papers rely on the novel properties of the coating material to create desired properties to dry and set the ink solutions. Jet inks typically contain 2.5% by weight of organic dyes. The dye is fixed to the paper surface either by evaporation of a base such as ammonia, by migration of a base such as diethanolamine into the paper, or by changes in ionic environment when the ink meets the coating material layer.

The paper must exhibit unique properties in order to produce a high quality printed image when the ink is fixed to the paper surface. Once the ink drop is accepted by the paper, the ink must adhere to the paper and spread minimally in all directions to generate sharp edges for print contrast[1] and image fidelity. The paper must be smooth to give high print densities[2]. In addition, the paper should minimize bleeding[3] and wicking while promoting the absorption of ink to set the dye onto the coated surface since this promotes higher print densities. Ink jet droplets must be adsorbed quickly to avoid image smearing and multiple drop splatter. The dyes should be deposited near the paper surface to maximize color density and contrast while minimizing show through[4].

[1] Contrast is defined as the tonal change in color from light to dark.
[2] Density is defined as the degree of color or darkness of an image.
[3] Bleeding is defined as ink traveling into the sheet.
[4] Show through is defined as printing that is visible from the backside of a sheet, or the next sheet, under normal lighting conditions.

Coating, which generally contains pigment, binders, and additives, is applied to the paper surface to improve the properties of the paper. The ink interacts with the coating to produce a high quality image. The coating prevents the ink from penetrating into the substrate. More specifically, the coating can optimize drying time for high water content dyes and separate the water-soluble organic dyes from the water vehicle and hold the dye on the surface so it doesn't strike through to the base sheet. Smoothness and thickness of the coating layer are two important physical properties that impact print quality. Pore structure and contact angle wettability effect print quality by preventing ink spreading. In order to prevent wicking and feathering[5], it is important that the thickness of the coating layer be homogenous to a scale of a few microns in depth which also helps in the absorption of successive droplets of ink at high delivery rates and any water present.

[5] Feathering is defined as the spreading of ink at the edges of printed type, caused by irregularities in the ink or its distribution.

Paper made for ink jet printing should have a hydrophilic, high porosity surface with no macroscopic structure in order to absorb ink jet droplets quickly with little spreading, wicking or dye penetration. Therefore the preferred coating for the paper surface should contain a highly porous, high surface area pigment that wets almost instantly with water. If the coating has sufficient thickness and void volume, it should be able to absorb successive droplets in multicolor printing at the highest delivery rates of commercial ink jet printing. The dye should react with the coating material to make it waterfast and rub resistant. The coating should have near neutral or alkaline pH to avoid shifts from the intended color of the dyes.

The rate of ink penetration has a large effect on final optical density through its effect on drying time and setting of the dye on the coated surface. The rate of ink penetration can be explained by the Lucas Washburn Equation of capillary flow:

$$I^2 = \gamma r (\cos \theta) t / 4v$$

where I is the depth of ink penetration, r is the pore radius, t is time, $\gamma$ is the surface tension, $\theta$ is the contact angle, and v is the viscosity of the ink. In generating high print quality, the rate of ink penetration must be modified to allow sufficient wetting to occur. The hydrophilic/hydrophobic surface chemistry of the coating plays an important role in the development of image quality through the control of dot gain. Sufficient dot gain requires the dot spreading on a smooth surface and is a function of contact angle. The contact angle is itself a function of the interactions between the surface tension of the liquid, surface vapor, and liquid vapor interfaces. The determination of sufficient dot gain can be characterized through the surface tension of the interfaces from Young's equation:

$$\gamma_{slv} = \gamma_{sl} + \gamma_{lv} \cos \theta$$

This equation evaluates the development of the contact angle which controls spread of liquid through the surface tensions involved. If the contact angle is less than 90 degrees, surface roughness will reduce the contact angle even more. Whereas if the contact angle is greater than 90 degrees the surface roughness will increase the contact angle. Porosity also effects the measured contact angle.

The interactions between ink and the coated substrate play a vital role in producing images that are long lasting, well defined and of high strength regardless of printer application. The main interaction occurs at the surface of the substrate, where the type of bonding that occurs between the colorant and the media dictates the final print quality. The interactions that take place between the colorant and the plain paper are controlled by hydrogen bonding and Van der Waals forces, while ionic and electrostatic forces are responsible for the interactions between the colorant and the coated paper.

Hydrogen bonding is the most significant bonding that takes place between color and media, where cellulosic material is involved. For a large dye molecule, a large number of sites are available for hydrogen bonding which encourage the interaction between the colorant and the media. Hydrogen bonding between color and media increases the strength of the color binding on the media. Furthermore, the hydroxyl groups of the cellulose may interact with the δ cloud of an aromatic group on the colorant by hydrogen bonding.

Van der Waals forces are very weak when the interacting groups are far apart and a weak repulsion typically exists between the media and anionic dyes. The interaction between colorant and media becomes strong as the dyes start penetrating into the base sheet.

Electrostatic forces occur due to coloumbic attraction. The cationic groups on the media, such as $Ti^{3+}$, $Al^{3+}$, and $Ca^{2+}$ attract anionic dyes, such as water-soluble groups of $SO_3^{2-}$, $COO^-$, and $PO_4^{3-}$. The result is strong attraction between these groups, which causes an effective immobilization of the dye molecules, resulting in excellent print quality.

The δ—δ interactions are very strong interactions that typically occur between dye molecules. These interactions normally generate either dye aggregation or crystallization[6]. If dye—dye interactions on the paper substrate are stronger than dye-paper interactions, dye may aggregate on the substrate causing printing problems. Thus a strong interaction between colorant and media is required.

[6] Crystallization is a condition in which a dried ink film repels a second ink film repels a second ink which must be printed on top of it.

Hydrogen bonding and Van der Waals forces are the main interactions that occur in plain papers. Plain papers mainly consist of cellulose and therefore the main interactions are between the color and the cellulose. The penetration of color into the substrate will be controlled by capillary adsorption. If the paper has been internally or surface sized the rate of penetration of the colorant will be decreased which may lead to some ink bleeding and feathering problems.

The interaction of the colorant with coated paper is different however. The selection of the coating and ink formulation will have a significant effect on the ink absorption rate, image quality, and water/light fastness properties of the liquid ink. Electrostatic or ionic interactions play the key role in colorant coated paper interactions. Electrostatic interaction is stronger than hydrogen bonding and Van der Waals interactions. These interactions are more efficient, as the colorant is fixed in the vicinity where it was printed. The nature of the anionic dyes and the oxides will determine the print quality of ink jet printing since electrostatic interactions of the colorant with coated media occur between the anionic groups of the dyes and oxides. The binding energies of the dyes are greatly increased by electrostatic interactions resulting in high bonding strength.

Existing coated ink jet papers are mainly dependent on amorphous and gelled silica, which possess high micro porosity and macro porosity. The porous coating structure provides the driving force for the rapid diffusion of ink liquid into the coating layer and internal pore volume of the coating for storing large amounts of ink. These two properties interact to set the anionic dye at or near the coating surface, generating higher optical printing densities. The high surface area of the silica requires a strong binder to maintain adhesion to the paper and cohesion within the coating structure. Therefore, polyvinyl alcohol, the strongest binder available, is used.

Unfortunately, the current use of silica and polyvinyl alcohol has several limitations that effect the coating. The internal porosity of the silica pigments and the degree of hydrolysis of the polyvinyl alcohol limits running the coating solids at 20%. Silica pigments pose production problems and high cost because they must be coated at relatively slow speeds. Coating solids level is a major limiting factor with silica pigments because of viscosity, water absorption, and drying issues. Silica slurries alone do not usually flow well at levels above 15 to 20% solids, so dispersants are used to increase their concentrations. Also, silica has a great affinity for water given its high pore volume so it forms a paste as water is added until all the voids are filled. Only then is it fluid enough for the coating formulation. This behavior decreases the vehicle available for the slurry, so formulators must start at a lower solids concentration. The absorbed water in the pores also demands extra energy during drying. Calcium carbonate is another material sparingly used for ink jet printer coatings that dry similar to silica, but its surface area and void volume are much lower than silica—resulting in inferior image quality. It is also abrasive and can exhibit poor coater runnability. Its use is limited to cast coated ink jet papers for glossy photo prints where it is used as a supplementary pigment to silica.

With the compositions for coating paper currently on the market higher quality coated ink jet papers must be coated off-machine and are not cost effective. Producing a paper sheet with the desired properties is difficult due to the need to find ways to coat ink jet paper on-machine at commercial speeds with no loss in quality. The preferred finished ink jet paper should be smooth, strong, opaque, bright, and able to handle the demands of ink jet printing while providing excellent print results, such as excellent ink adherence, high scratch and ink resistance, and bleed control for sharp edges. It was therefore necessary to develop the composition for coating paper of the present invention that produces a coated paper that overcomes the disadvantages of the existing art while presenting a high print quality image at a reduced cost. More specifically, the present invention contemplates substituting a zeolite pigment for silica in matte ink jet coating formulations.

A zeolite pigment that possesses the desirable combination of brightness, color, particle size distribution, surface area, internal void volume, rheology and hardness could also be useful in overcoming the limitations of conventional and other specialty pigments in various papermaking and paper coating applications including but not limited to: (1) toner bond improvement in laser and other dry toner imaged digital papers; (2) elimination of smudging and improvement of print quality in direct print flexography on coated linerboard used in corrugated containers; (3) elimination of print through on newsprint and ultra light weight coated papers; (4) improvement of dot fidelity and print quality on coated rotogravure printing papers; (5) low abrasion extender for titanium dioxide pigments; (6) improvement of coefficient of friction of paper and paperboard; (7) production of technical specialty papers such as anti-tarnish, gas filtration, and absorbent papers with improved properties and lower cost of manufacture; (8) more economical microparticulate retention system chemistry; (9) additive to improve the efficiency of deinking systems.

Zeolites are crystalline, hydrated aluminosilicates of the alkali and alkaline earth metals. More particularly, zeolites are framework silicates consisting of interlocking tetrahedrons of $SiO_4$ and $AlO_4$. In order to constitute a zeolite the ratio of silicon and aluminum to oxygen must be ½. The alumino-silicates structure is negatively charged and attracts the positive cations that reside within. When exposed to higher charged ions of a new element, zeolites will exchange the lower charged element contained within the zeolite for a higher charged element. Unlike most other tectosilicates, zeolites have large vacant spaces or cages in their structures that allow space for large cations such as sodium, potassium, barium, and calcium and relatively large molecules and cationic molecules, such as water, ammonia, carbonate ions, and nitrate ions. In most useful zeolites, the spaces are interconnected and form long wide channels of varying sizes depending on the mineral. These channels allow ease of movement of the resident ions and molecules into and out of the structure.

Zeolites are characterized by 1) a high degree of hydration, 2) low density and large void volume when dehydrated, 3) stability of the crystal structure of many zeolites when dehydrated, 4) uniform molecular sized channels in the dehydrated crystals, 5) ability to absorb gases and vapors, 6) catalytic properties, and 7) cation exchange properties.

The use of natural zeolites in paper making has a long history, but has been almost unique to Japan where zeolite has been used as filler to improve bulkiness and printability. Natural zeolites have also been used as fillers for paper in Hungary. These natural zeolites however are a low brightness material and this renders it unsatisfactory for application in the United States on coated ink jet paper where high brightness is expected.

Numerous families of natural zeolites exist and each has varying characteristics. Unfortunately, natural zeolites exhibit nonuniform properties that makes them difficult to work with in many applications because ores from one location can vary with any other. It is however possible to manufacture zeolites with uniform properties. The preferred zeolite for use in the present invention is a processed form of the natural mineral clinoptilolite which is a hydrated sodium potassium calcium aluminum silicate having the formula $(Na, K, Ca)_{2-3}Al_3(Al,Si)_2Si_{13})_{36}$—$12H_2O$. This zeolite is within the family Heulandite that also includes the mineral heulandite which is a hydrated sodium calcium aluminum silicate. The physical characteristics of raw clinoptilolite are listed in Table 1.

TABLE 1

PHYSICAL CHARACTERISTICS OF CLINOPTILOLITE

Color is colorless, white, pink, yellow, reddish and pale brown.
Luster is vitreous to pearly on the most prominent pinacoid face and on cleavage surfaces.
Transparency: Crystals are transparent to translucent.
Crystal System is monoclinic; 2/m.
Crystal Habits include blocky or tabular crystals with good monoclinic crystal form. More tabular and proportioned than heulandite. Also commonly found in acicular (needle thin) crystal sprays.
Cleavage is perfect in one direction parallel to the prominent pinacoid face.
Fracture is uneven.
Hardness is 3.5–4, maybe softer on cleavage surfaces.
Specific Gravity is approximately 2.2
Streak is white.

Clinoptilolite's structure is sheet like with a tectosilicate structure where every oxygen is connected to either a silicon or an aluminum ion (at a ratio of $[Al+Si]/O=\frac{1}{2}$). The sheets are connected to each other by a few bonds that are relatively widely separated from each other. The sheets contain open rings of alternating eight and ten sides. These rings stack together from sheet to sheet to form channels throughout the crystal structure. The size of these channels controls the size of the molecules or ions that can pass through them. Clinoptilolite is well suited for various applications, such as in paper coating compositions, because it exhibits large pore space, high resistance to extreme temperatures, and has a chemically neutral structure.

SUMMARY OF THE INVENTION

An object of the present invention is to provide a novel purified natural zeolite pigment for coated ink jet papers and digital printing papers to replace silica pigments.

Another object of the present invention is to provide a novel purified natural zeolite pigment that can be used as a specialty coating pigment in coated linerboard for direct post print flexography to prevent smudging and to improve image fidelity.

Still another object of the present invention is to provide a novel purified natural zeolite pigment that can act as a supplementary coating pigment in ultra lightweight coated publication papers.

It is yet another object of the present invention to provide a novel purified natural zeolite pigment that can act as a supplementary coating pigment for water based gravure[7] printing papers.

[7] Gravure printing is a method of printing using etched metal cylinders.

An additional object of the present invention is to provide a novel purified natural zeolite pigment that can replace calcined kaolin as a titanium dioxide extender in coated recycled paperboard and coated solid unbleached sulfate (SUS) beverage carrier stock.

It is still another object of the present invention to provide a novel purified natural zeolite pigment that can act as filler in newsprint to prevent print-through.

It is yet another object of the present invention to provide a novel purified natural zeolite pigment that can act as filler in specialty technical papers such as anti-tarnish, gas filtration, filter, and absorbent papers.

Another object of the present invention is to provide a novel purified natural zeolite pigment that can be used as a microparticulate retention aid.

Still another object of the present invention is to provide a novel purified natural zeolite pigment that can be used as a deinking aid in combination flotation-washing systems.

Yet another object of the present invention is to provide a novel purified natural zeolite pigment that can be used as a coefficient of friction (COF) control aid in recycled linerboard.

Another object of the present invention is to provide a novel purified natural zeolite pigment for use in a coating composition that has improved rheology compared to silica and other specialty pigments.

Still another object of the present invention is to provide a novel purified natural zeolite pigment for use in a coating composition that improves coater runnability.

It is yet another object of the present invention to provide a novel purified natural zeolite pigment for use in a coating composition that has decreased energy consumption in drying.

It is an object of the present invention to provide a novel composition for coating paper that has water slurries with a higher percentage of solids and good shear thinning rheology compared to existing compositions.

Another object of the present invention is to provide a novel composition for coating paper that has higher coating formulation solids compared to existing compositions.

Still another object of the present invention is to provide a novel composition for coating paper that has enhanced on-machine coating run ability and therefore enhanced production rates over existing compositions.

It is yet another object of the present invention to provide a novel composition for coating paper that has low Einlehner abrasion which results in reduced wear to process equipment and no metallic marks are left on the paper by the gripper bars.

Another object of the present invention is to provide a novel composition for coating paper that has a low bulk density.

Still another object of the present invention is to provide a novel composition for coating paper that has faster on-machine drying rates because of higher percent solid coatings than existing compositions which results in lower drying costs and reduced print smear.

Yet another object of the present invention is to provide a novel composition for coating paper that has a low crystalline silica content.

It is another object of the present invention to provide a novel composition for coating paper that coats with essentially no dusting.

It is still another object of the present invention to provide a novel composition for coating paper that has improved first pass retention in paper machine trials compared to existing compositions.

Another object of the present invention is to provide a novel composition for coating paper that has improved optical/reflective densities of four-color cyan, magenta, yellow, black (CMYK) ink jet print.

An additional object of the present invention is to provide a novel composition for coating paper that makes lighter coat weights possible because of higher internal void volume.

Still another object of the present invention is to provide a novel composition for coating paper with a slightly basic pH.

Yet another object of the present invention is to provide a novel composition for coating paper that has a high brightness of 90% or more.

Another object of the present invention is to provide a novel composition for coating paper that has a narrow particle size distribution with few fines.

An additional object of the present invention is to provide a novel composition for coating paper that improves ink jet print density.

It is yet another object of the present invention to provide a novel composition for coating paper that improves ink receptivity in printing papers.

Still another object of the present invention is to provide a novel composition for coating paper that has improved opacity.

An additional object of the present invention is to provide a novel composition for coating paper that has less soak-in and reduced roughening of the base sheet during application which results in a smoother coated sheet.

Another object of the present invention is to provide a novel composition for coating paper that allows higher operating speeds and higher production rates.

It is still an additional object of the present invention to provide a novel composition for coating paper that has the capability to coat on high speed paper machines rather than only on low speed off machine coating lines which reduces waste and costs.

In satisfaction of these and related objectives, Applicant's present invention provides a purified natural zeolite pigment composition for coating and/or filling of paper. Applicant's invention permits its practitioner to manufacture coated paper for use in ink jet printers that exhibits improved characteristics over existing uncoated and coated papers such as high print quality images and reduced cost. It also permits the practitioner to make other specialty and technical papers that exhibit quality and economic advantages over papers made with existing technology and commercially available materials.

DETAILED DESCRIPTION OF THE PREFERRED EMBODIMENT

The processed zeolite used in the present invention has several specific characteristics as indicated in Table 2.

TABLE 2

Characteristics of Zeolite Pigment Samples

| Specification | Zeolite Pigment Sample 1 | Zeolite Pigment Sample 2 |
| --- | --- | --- |
| GE Brightness[8] % | 94+ | 90+ |
| L[9] | 98.46 | 98.00 |
| a | 0.43 | 0.44 |
| b | 1.25 | 1.72 |
| Yellowness Index | 2.48 | 2.05 |
| Particle Size $\mu$, <D90 | 2.0 | 2.0 |
| Einlehner Abrasion, mg loss | 12 | 18 |
| Loose Density, lbs./cu. ft. | 8 | 8 |
| Packed Density, lbs./cu. ft. | 12 | 12 |
| Refractive Index | 1.48 | 1.48 |
| Surface Area, sq. m./g. | 40–50 | 40–50 |
| Oil Absorption, lbs./100 lbs. | 70–80 | 70–80 |
| Density, g/cc | 2.2 | 2.2 |
| pH in Water | 5.0 | 8.5 |
| Cation Exchange Capacity | 1.6–1.8 | 1.8–2.0 |
| Brookfield Viscosity, 20 rpm @ 40% solids* | 1000 cPs | 1000 cPs |
| Hercules Viscosity @ 1100 rpm* | 1 dyne | 1 dyne |

*Nonoptimized dispersion in water
[8]GE Brightness is a directional brightness measurement utilizing essentially parallel beams of light with a wavelength of 457 nm to illuminate the paper surface at an angle of 45°. It is also referred to as TAPPI Brightness. GE or TAPPI Brightness is the value obtained by TAPPI Test method T646 om-94 "Brightness of Clay and Other Mineral Pigments" (45 degrees/0 degrees).
[9]L, a, b values are the chromacity coordinates or color values of paper or paperboard measures with tristimulus filter colorimeters or spectrophotometers incorporating direction (45°/0°) geometry and CIE (International Commission on Illumination) illuminant C. "L" represents lightness, increasing from zero for black to 100 for white; "a" represents redness when plus, greenness when minus and zero for gray; "b" represents yellowness when plus, blueness when minus, and zero for gray. This is referred to as TAPPI Test Method T 524 om-94 "Color of Paper and Paperboard (45°/0° Geometry)."

In evaluating the usefulness of the present zeolite, its material properties were tested. The first step was to determine whether the zeolite pigment could be dispersed using commonly available dispersants.

The colorants used in aqueous ink jet printer inks are anionic. A cationic material is used along with the pigment to fix the printed image to the paper. It is most desirable that an ink jet pigment be dispersible with a cationic dispersant with the dispersant providing dual functionality in the coating. The standard cationic dispersant for silica ink jet coatings is poly-dimethyl-diallyl ammonium chloride (DMDAAC) which has a common usage rate of 5% on dry pigment.

Evaluation of dispersants was done by adding a pre-weighed amount of pigment (enough to yield a 50% solids dispersion) to water under high shear using a Cowles Dissolver™ disperser.[10] The pigment was added slowly to the water until the viscosity of the pigment began to substantially increase. This occurred around the 46% solids point. The dispersant being evaluated was then added to drop the viscosity, and the remainder of the pigment was added. Samples of the pigment dispersion were taken for Brookfield viscosity and Hercules high-shear rheology testing. The final solids content was determined by oven drying a sample of the pigment dispersion.

[10] Cowles Dissolver™ is the trade name for an open rotor high shear mixer-dispenser manufactured by Morehouse-Cowles Corp., Fullerton, Calif.

The present zeolite was successfully dispersed with 5% DMDAAC to provide 50.7% slurry solids with Brookfield viscosity of 414 cPs at 100 rpm with a No.4 spindle. The 20-rpm viscosity at 50.7% solids was 1520 cPs. The lower viscosity at 100 rpm indicates that the present zeolite pigment has a shear thinning rheology which is highly desirable for application on blade, rod, and metering size press coaters. With silica pigments, such as Grace-Davison's Sylojet™, J. M. Huber's Optisil™ or ICI Crosfield's Gasil®, use of 5% DMDAAC provides dispersion at <30% maximum solids. The lower solids of silica dispersions severely limit application solids for formulated coating colors. Silica pigments are also known to be dilatant or shear thickening, which causes running problems on blade and rod coaters. The rheology of silica pigments makes it impractical to run them in on-machine metering size press coatings at solids content high enough to prevent soak-in and binder migration. Hercules high-shear rheograms of the present zeolite pigment confirmed that the present pigment provides rheology suitable for good coater runnability and sheet surface quality.

For use in applications other than ink jet printing—for example as an adjunct pigment in coating formulations including kaolin clay, calcium carbonate and titanium dioxide—it is desirable that the zeolite pigment be dispersible with a standard dispersant used for conventional pigments. The present zeolite was also successfully dispersed with 2% AMP-95™ (2-amino, 2-methyl, 1-propanol)[11] to provide a stable dispersion at 50.34% solids with Brookfield viscosity of 470 cPs at 100 rpm with a No. 4 spindle. The 20-rpm viscosity at 50.34% solids was 1680 cPs. Hercules high-shear rheograms showed the AMP-95™ zeolite dispersion to be thixotropic and shear thinning—desirable rheology for paper and paperboard coating.

[11] AMP-95™ (2-amino, 2-methyl, 1-propanol), a commercial dispersant manufactured by Angus Chemical Company, Buffalo Grove, Ill.

Drawdowns[12] of pure dispersed zeolite pigment of the present invention on a 76.6% brightness base sheet gave 86.0% GE brightness.

[12] A drawdown is a coating chemist's method of coating a small sheet of paper for testing purposes. A bead of pigment slurry or coating is placed on the paper and drawn down with a wire wound rod which provides uniform volumetric metering onto the sheet surface. Coat weight per unit area is controlled by the choice of wire winding i.e. larger or small grooves for the coating to flow between adjacent wire grooves.

Drawdowns were made with various ratios of pigment to PVOH (polyvinyl alcohol) binder to determine the CPVC.[13] The CPVC was found to be 50%, that is a pigment to binder ratio of 1:1.

[13] CPVC (Critical Pigment Volume Concentration) is the pigment volume concentration at which the binder just fills the volume between pigment particles.

Dusting was also evaluated. Dusting[14] (sometimes called "rub off" or "chalking" is a major potential problem with ink jet papers made with silica pigments. Many coaters find that they must add polyvinyl pyrolidone (PVP) to control dusting. Drawdowns were made with the present zeolite and polyvinyl alcohol at pigment binder ratios up to 14:1 to evaluate the dusting potential. No PVP was added. The present zeolite pigment coatings did not dust at pigment to binder ratios up to 14:1, which provides a significant performance advantage.

[14] Dusting occurs when the coating pigment particles are not adequately bound to one another and/or the sheet surface. Coating pigment particles are easily dislodged from the coated sheet surface by rubbing and/or when the coated sheet is folded, slit, or die cut. Airvol® 203 is a partially hydrolyzed (87.0–89.0% hydrolysis) polyvinyl alcohol produced by Air Products and Chemicals, Inc. Allentown, Pa.

The results showed that the present processed zeolite pigment could act as an ink jet coating pigment.

Laboratory coating formulation experiments were performed to determine the viscosity at highest obtainable coating solids. The present zeolite was dispersed with 5% DMDAAC at 50.7% solids. A 30% solution of Airvol® 203 PVOH[15] was prepared by dispersing the granules in cold water, heating to 85° C. and holding at 85° C. for 30 minutes. The dispersed zeolite slurry and PVOH solutions were blended to obtain pigment to binder ratios of 2:1, 4:1, 6:1 and 8:1 with no dilution water added.

Viscosity determination of the coating formulations was made using a Brookfield RVT viscometer with a #5 spindle. The data obtained from these experiments is contained in Table 3a and can be compared to data from three major suppliers of silica pigments as contained in Table 3b and to data from Engelhard™ regarding a modified kaolin based pigment as contained in Table 3c.

TABLE 3a

Brookfield Viscosity of Zeolite Formulations

| Pigment:Binder Ratio | % Coating Solids | 20 rpm | 100 rpm |
|---|---|---|---|
| 2:1 | 40.17 | 4000 | 1750 |
| 4:1 | 41.87 | 5400 | 1972 |
| 6:1 | 43.09 | 6760 | 2100 |
| 8:1 | 45.93 | 7880 | 2368 |

TABLE 3b

Coating Formulation Solids Content from Silica Suppliers' Data Sheet and/or the sheet surface. Coating pigment particles are easily dislodged from the coated sheet surface by rubbing and/or when the coated sheet is folded, slit, or die cut.
Airvol ® 203 is a partially hydrolyzed (87.0–89.0% hydrolysis) polyvinyl alcohol produced by Air Products and Chemicals, Inc. Allentown, PA.

| Supplier | Grace-Davison | J. M. Huber | ICI Crosfield |
|---|---|---|---|
| Product | Sylojet ™ | Optisil ™ | Gasil□ |
| Pigment:Binder Ratio | 2.49:1 | 1.00–1.67:1 | 2.5:1 |
| % Solids | 18.4 | 14–18 | 18 |

TABLE 3c

Coating Solids Recommendation from Engelhard Data Sheet

| Supplier | Engelhard |
|---|---|
| Product | Digitex ™ |
| Pigment:Binder Ratio | 2.5:1 |
| Coating % Solids | 30 to 33% |

As can be seen from these data, the present zeolite pigment provides coating color solids more than twice as high as any of the currently used silica pigments. It provides coating solids 21% higher than the highest coating solids claimed from the Engelhard Digitex™ hybrid kaolin pigment. The present zeolite pigment provides shear-thinning rheology to facilitate application by blade, rod, or metering size press coaters. The higher solids attainable with the zeolite pigment of the present invention provide substantial operating benefits to producers of ink jet papers including less soak in and reduced roughening of the base sheet during application resulting in a smoother coated sheet, improved coater runnability, decreased energy consumption in drying, higher operating speeds and higher production rates and capability to coat on high speed paper machines rather than only on low speed off machine coating lines which reduces waste and costs.

Test printing of the drawdowns on Canon and Epson ink jet printers showed that density improved as the pigment to binder ratio was decreased from 8:1 to 2:1. At 2:1 pigment to binder ratio, the present zeolite pigment drawdowns came close to the value for commercial papers Weyerhaeuser Satin Ink Jet™ and International Paper Great White™ Premium Matte Ink Jet Paper. The commercial papers had been produced on full-scale machinery with optimized formulations and calendered to improve performance. Due to these results, it was determined that pilot coating trials should be performed.

The zeolite of the present invention was evaluated as a coating pigment and filler with an emphasis on coating ink jet papers as a replacement for silica. For the pilot coating, Cylindrical Laboratory Coater (CLC) trials were performed. The CLC[16] is a laboratory device that simulates coating at commercial machine speeds while consuming only small amounts of coating materials. It provides not only coated paper samples for evaluation, but also indications of runnability in commercial production. The coating experiments were performed using the zeolite of the present invention as the sole pigment with polyvinyl alcohol binder at varying pigment to binder ratios. More specifically, the experimental design used was based on E-Chip using the following parameters: 1) pigment: binder ratios of 2:1, 5:1, and 8:1; 2) polyvinyl alcohol types from Air Products™ including Airvol® 103 (fully hydrolyzed 98.0–98.8% hydrolysis) and Airvol® 203 (partially hydrolyzed 87.0–89.0% hydrolysis); 3) Amp 95™ and DMDAAC as dispersants; 4) coat weights of 6, 9 and 12 grams/square meter; 5) 23 combinations of conditions; and 6) 29 total runs. The CLC trials were run at 2500–3600 feet/minute. Blade metering was done with 0.015-inch thick coating blade and a 0.018-inch thick backing blade using a 0.4-inch extension. The results of these trials are indicated in Table 4.

[16] The Cylindrical Laboratory Coater is manufactured by Sensor & Simulation Products, a division of Weyerhaeuser Co., Tacoma, Wash.

TABLE 4

Results of Cylindrical Laboratory Coater (CLC) Pilot Trials

| Pigment:binder ratio | PVOH | Speed | Runnability/Coverage |
| --- | --- | --- | --- |
| 2:1 | 203 | 2000 | Excellent |
| 2:1 | 203 | 2500 | Excellent |
| 6:1 | 203 | 2000 | Excellent |
| 6:1 | 203 | 3000 | Good |
| 6:1 | 203 | 3200 | Good |
| 6:1 | 203 | 3600 | Uneven |
| 8:1 | 203 | 2000 | Excellent |
| 8:1 | 203 | 2800 | Good |
| 8:1 | 203 | 3200 | Uneven at start |
| 8:1 | 103 | 3200 | Good |
| 8:1 | 103 | 3400 | Uneven |

The trials demonstrated that excellent runnability and coverage could be achieved at 2500 feet/minute, a speed substantially higher than the 900–1500 feet/minute common on off-machines producing coated ink jet papers. Optimization of the coating formulation of the present invention can increase the speeds at which the present zeolites can be used to coat ink jet paper.

In evaluating the present zeolite for use in coating ink jet paper it was important to take into account the effects of calendering[17]. Commercial coated ink jet papers are usually soft nip calendered to improve image density. In order to determine the effects of calendering, test prints were made with both uncalendered and laboratory calendered CLC coated papers. As expected, calendering improved print density. The samples were printed on three different commercial ink jet printers, Canon BJ500™, HP 932C™, and Epson 800™. Two commercial premium coated ink jet papers, Weyerhaeuser Satin Ink Jet™ and International Paper Great White™ Premium Matte Ink Jet Paper, and a plain paper specially surface sized for ink jet printing were printed as bench marks. The ink densities of the printed sample were compared using an X-Rite densitometer. The ink densities of the present zeolite coated papers were found to be statistically equal to or better than the premium commercial papers for all three printers. The best quality was achieved at 2:1 pigment to binder ratio. The results of this experiment are contained in Table 5, which presented the data for the laboratory-calendered samples. Laboratory calendering increased densities of all four colors on all three printers. No attempt was made to optimize the zeolite formulations in contrast to the commercial silica coated papers that are made with optimized formulations and manufacturing procedures. In commercial practice, each paper manufacturer will optimize its formulation to match the characteristics of the base paper to be coated and the coating equipment to be used.

[17] Calendering is the process of compacting and smoothing paper during manufacture by passing it through a stack of polished metal rollers called calenders.

TABLE 5

Printability Tests of CLC Coated with Zeolite
CLC SAMPLES (Flexible Blade Coated)
Airvol 203 2:1 Pigment to Binder (35% solids)
Average Reflective Densities-X-Rite Densitometer

|  | Cyan | Magenta | Yellow | Black |
| --- | --- | --- | --- | --- |
| Printed on HP932C (600 × 600 dpi) | | | | |
| CLC Coated Samples | | | | |
| Coat Weight-gsm | | | | |
| 3.6 | 1.334 | 1.398 | 0.962 | 1.536 |
| 4.6 | 1.312 | 1.412 | 0.974 | 1.522 |
| 5.4 | 1.316 | 1.338 | 0.964 | 1.498 |
| 8.8 | 1.302 | 1.404 | 0.958 | 1.566 |
| 13.9 | 1.354 | 1.438 | 0.980 | 1.530 |
| Commercial Paper Control Samples | | | | |
| Great White | 1.110 | 1.162 | 0.896 | 1.494 |
| Weyerhaeuser | 1.408 | 1.478 | 1.026 | 1.612 |
| Plain Multi-Purpose | 1.100 | 1.150 | 0.900 | 1.500 |
| Printed on EPSON 800 series (720 × 1440 dpi) | | | | |
| CLC Coated Samples | | | | |
| Coat Weight-gsm | | | | |
| 3.6 | 0.988 | 1.186 | 0.890 | 1.514 |
| 4.6 | 1.054 | 1.190 | 0.906 | 1.530 |
| 5.4 | 1.016 | 1.190 | 0.898 | 1.548 |
| 8.8 | 1.042 | 1.184 | 0.892 | 1.498 |
| 13.9 | 1.048 | 1.200 | 0.898 | 1.522 |
| Commercial Paper Control Samples | | | | |
| Great White | 1.030 | 1.250 | 0.960 | 1.636 |
| Weyerhaeuser | 0.888 | 1.020 | 0.860 | 1.280 |
| Plain Multi-Purpose | 0.946 | 1.036 | 0.836 | 1.306 |

TABLE 5-continued

Printability Tests of CLC Coated with Zeolite
CLC SAMPLES (Flexible Blade Coated)
Airvol 203 2:1 Pigment to Binder (35% solids)
Average Reflective Densities-X-Rite Densitometer

| | Cyan | Magenta | Yellow | Black |
|---|---|---|---|---|
| Printed on CANON BJC 5000 (720 × 1440 dpi) | | | | |
| CLC Coated Samples | | | | |
| Coat Weight-gsm | | | | |
| 3.6 | 1.524 | 1.568 | 0.934 | 1.420 |
| 4.6 | 1.532 | 1.422 | 0.898 | 1.410 |
| 5.4 | 1.474 | 1.510 | 0.908 | 1.396 |
| 8.8 | 1.548 | 1.602 | 0.932 | 1.500 |
| 13.9 | 1.468 | 1.608 | 0.946 | 1.530 |
| Commercial Paper Control Samples | | | | |
| Great White | 1.438 | 1.486 | 0.972 | 1.560 |
| Weyerhaeuser | 1.146 | 1.308 | 0.866 | 1.748 |
| Plain Multi-Purpose | 0.978 | 1.052 | 0.802 | 1.448 |

In addition to its high quality performance, the zeolite pigment provides other significant advantages compared to silica pigments. The zeolite pigment produces higher slurry solids with 50% for zeolite compared to 30% maximum for silica and 42–45% for specialty hybrid kaolin pigments which is a significant advantage in coating preparation. In addition, the zeolite pigment has higher coating solids with 36–40% for zeolite pigment compared to <20% for silica and 30–33% for specialty hybrid kaolin pigments which means significantly lower cost for drying and higher coating line operating speeds. Coating at higher solids not only saves energy and increases production rate, but also results in a higher quality coated surface. The zeolite pigment also has a low binder demand. Coatings prepared at pigment-to-binder ratios as high as 14:1 did not show signs of cracking or flaking. With silica pigment, it is essential to use polyvinyl alcohol, which is the strongest available binder. An inexpensive starch cobinder can be used with the zeolite pigment of the present invention. This capability can be a key to making a higher fidelity mid-priced coated ink jet paper. The zeolite pigment additional has excellent rheology for use in various types of coaters including on-machine metering size presses. Silica coatings must be applied on low speed (1000 to 1500 feet/minute) off machine coaters, which significantly increases costs. Coating with the zeolite pigment of the present invention on-machine at speeds in the 3000–4000 feet/minute range combined with elimination of the extra costs associated with off machine coating can facilitate serving a larger market.

The best ink jet densities were obtained using polyvinyl alcohol binder at 2:1 pigment to binder ratio. Density was reduced at higher pigment-to-binder ratios. This confirms the function of the superior pigment void volume of the zeolite pigment. The implication of this is that the zeolite pigment of the present invention can be effective in several applications including improvement of flexo ink vehicle receptivity to prevent smudging in direct post print of corrugated containers and use of the pigment as filler in newsprint and uncoated ground wood papers to eliminate print-through. Calcined kaolin, silicas, and silicates currently used in this second application are not cost effective.

Changes in retailing are driving the need for high quality multi-color printing on corrugated containers. In-line printing via flexography[18] without drying is the current preferred process. If the ink vehicle is not rapidly absorbed the surface smudges. Use of coating pigments with good void volume can prevent smudging. The best performing current pigments are calcined kaolin and calcium carbonate; however, both are abrasive. Abrasive coating pigments make the surface prone to metal marking producing gray streaks on the printed image. Use of the zeolite pigment of the present invention which is nonabrasive as 10 to 15% of the total coating pigment should provide the needed ink vehicle absorption without metal marking.

[18] Flexography is a method of printing on a web press using rubber plates with raised images.

Coating drawdowns on linerboard were performed to determine the impact of the zeolite pigment on dynamic contact angle wetability, which is a good predictor of performance in direct print flexo on corrugated. Linerboard was precoated with 10 gsm of precoat formulation. The precoated samples were then top coated with 15 gsm of a standard formulation and also a formulation substituting 10 parts ZOBrite pigment.

The coating formulations used were:

| Dry Parts | Component |
|---|---|
| Precoating-Applied at 10 gsm | |
| 100 | Exsilon ™ chemically structured kaolin |
| 15 | Acetate latex-Rohm & Haas 3103 |
| 3 | Pro-Cote ® 4200 cold water dispersible soy protein |
| 0.9 | AZC crosslinker-HTI AZ-Cote ® 5800 M |
| 0.1 | Polyacrylate dispersant-Dispex ® N-40 |
| 0.28 | Ammonia-as required for pH 8.5 |
| Top Coat Without Zeolite-Applied at 15 gsm | |
| 40 | No. 1 high brightness coating clay-Ultra-White 90 |
| 40 | Fine ground calcium carbonate-Hydrocarb ® 90 |
| 20 | Titanium dioxide-rutile-TiPure ® RPS Vantage |
| 14 | Acetate latex-Rohm & Haas 3103 |
| 4 | Pro-Cote 4200 cold water dispersible soy protein |
| 0.7 | Calcium stearate lubricant-Nopcote ® C-104-HS |
| 1.6 | AZC crosslinker-HTI AZ-Cote ® 5800 M |
| 0.1 | Polyacrylate dispersant-Dispex ® N-40 |
| 0.42 | Ammonia-as required for pH 8.5 |
| Top Coat With Zeolite-Applied at 15 gsm | |
| 10 | Zeolite pigment |
| 35 | No. 1 high brightness coating clay-Ultra-White 90 |
| 35 | Fine ground calcium carbonate-Hydrocarb ® 90 |
| 20 | Titanium dioxide-rutile-TiPure ® RPS Vantage |
| 14 | Acetate latex-Rohm & Haas 3103 |
| 4 | Pro-Cote 4200 cold water dispersible soy protein |
| 0.7 | Calcium stearate lubricant-Nopcote ® C-104-HS |
| 1.6 | AZC crosslinker-HTI AZ-Cote ® 5800 M |
| 0.1 | Polyacrylate dispersant-Dispex ® N-40 |
| 0.42 | Ammonia-as required for pH 8.5 |

Figure 1:
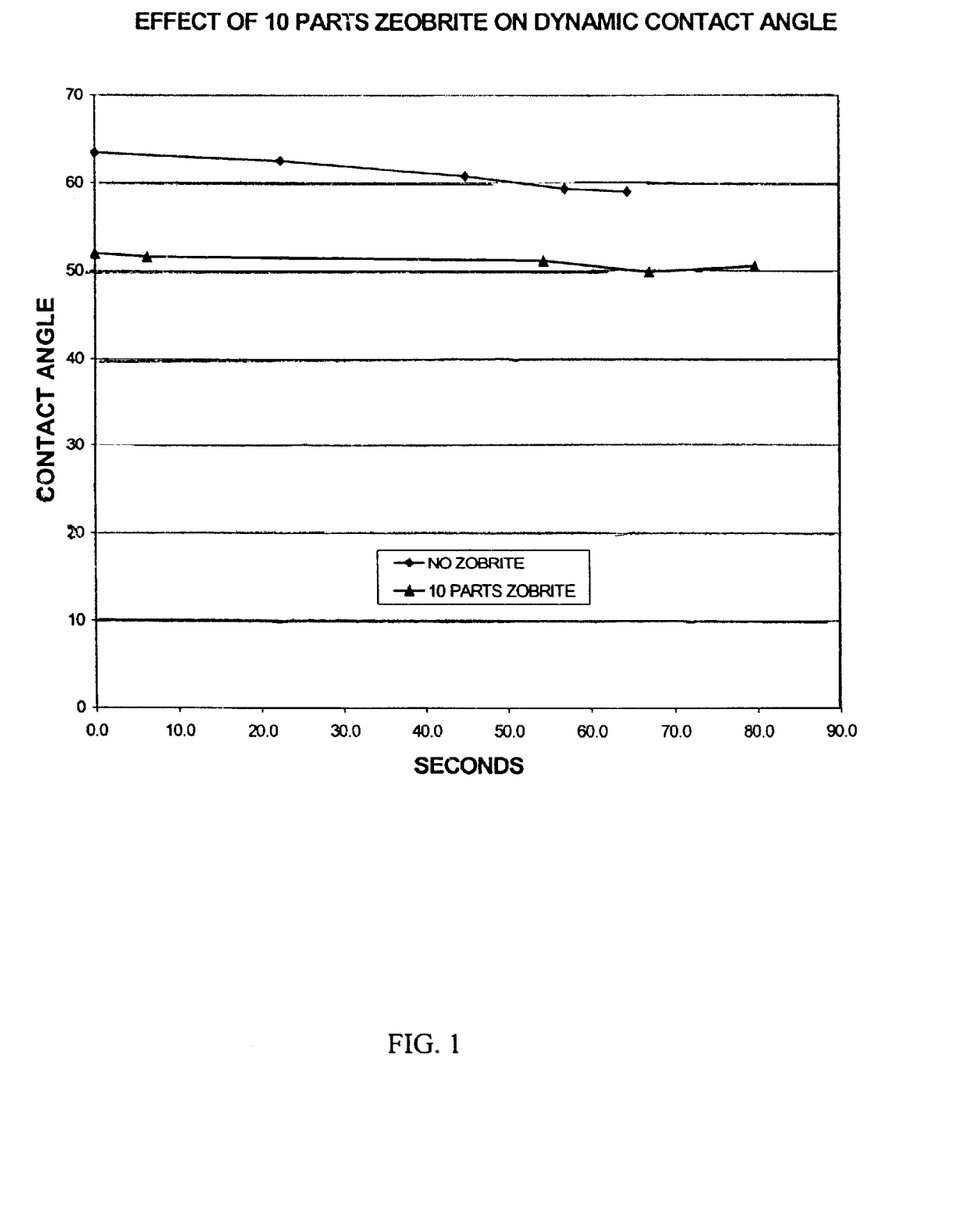
FIG. 1 is a graph of the dynamic contact angle versus time in seconds for coating compositions both with and without the zeolite pigment of the present invention.

The dynamic contact angle of the coated samples was measured and the results shown in Table 6 and FIG. 1. It was found that substitution of 10 parts zeolite in the top coat formulation provided a significant improvement in dynamic contact angle wetability. This shows the zeolite provides the capability to capture flexo ink in direct print (without drying) on a flexo-folder-gluer or case-making machine. The top coat coated with the zeolite composition was evaluated for metal marking by rubbing the surface with a nickel coin. No metal marking was observed.

TABLE 6

Dynamic Contact Angle Measurements of Coated Linerboard

| Time Seconds | No Zeolite | Time Seconds | 10 Parts Zeolite |
|---|---|---|---|
| 0.0 | 63.42 | 0.0 | 51.91 |
| 22.5 | 62.52 | 6.3 | 51.53 |
| 45.0 | 60.69 | 54.5 | 51.07 |
| 57.0 | 59.27 | 67.1 | 49.85 |
| 64.5 | 58.98 | 79.8 | 50.51 |

Further trials were run on the CLC to determine the effect of substitution of the present zeolite for No. 1 high brightness clay in a standardized paperboard topcoat formulation:

Standardized Topcoat Formulation

| Dry Parts | Component |
|---|---|
| 40 | No. 1 high brightness coating clay-Ultra-White 90 ® |
| 40 | Fine ground calcium carbonate-Hydrocarb ® 90 |
| 20 | Titanium dioxide-rutile-TiPure ® RPS Vantage |
| 14 | Acetate latex-Rohm & Haas 3103 |
| 4 | Pro-Cote 4200 cold water dispersible soy protein |
| 0.7 | Calcium stearate lubricant-Nopcote ® C-104-HS |
| 1.6 | AZC crosslinker-HTI AZ-Cote ® 5800 M |
| 0.1 | Polyacrylate dispersant-Dispex ® N-40 |
| 0.42 | Ammonia-as required for pH 8.5 |

The control topcoat was made up at 55% solids and pH 8.5. Brookfield viscosity was 600 cPs using a No. 6 spindle at 100 rpm. Experimental coatings were made by substituting 5, 10, 15 and 20 parts zeolite pigment for No. 1 coating clay. These coatings were also prepared at 55% solids and pH 8.5. Each of the coatings was evaluated on a Hercules high shear rheometer using Bob E, 6600 rpm and spring set 200. Rheograms showed all coatings to be shear stable. Torque at 6600 maximum rpm for each of the coatings was:

| Parts Zeolite | Torque-kilodyne-cm |
|---|---|
| 0 | 1750 |
| 5 | 1800 |
| 10 | 2128 |
| 15 | 2053 |
| 20 | 2507 |

The topcoats were applied to precoated recycled paperboard using a CLC laboratory coater with a blade application and a target coat weight of 4 to 5 pounds per 1000 square feet. Three replicates were done for the control and each of the four experimental coatings for a total of 15 samples. Each sample was then calendered on a hard/soft nip calender at 600 pli for three passes before evaluation.

The coated and calendered unprinted paperboard samples were tested for dynamic contact angle. The results of the dynamic contact angle showed that the 15 parts of zeolite had the best absorption followed closely by the 5 and 10 parts of zeolite pigment. The more rapid drop of the contact angle with the specimens containing zeolite pigment shows that the zeolite pigment adds a greater absorption rate into the coated surface. Increasing the zeolite pigment fraction to 20 parts did not provide better absorption than achieved with 15 parts zeolite pigment.

The coated and calendered unprinted paperboard samples were tested for brightness with the following results:

| Parts Zeolite | Brightness |
|---|---|
| 0 | 82.1 |
| 5 | 83.8 |
| 10 | 84.1 |
| 15 | 80.5 |
| 20 | 80.5 |

There was a gain in brightness from the control (0 parts zeolite pigment) with 5 and 10 parts of zeolite pigment, then the brightness dropped with higher levels of zeolite pigment. This is encouraging for two reasons: (1) there is an increase in brightness with the addition of small amounts of zeolite pigment and (2) this increase in brightness could allow for more intense calendering of the formulations with 5 and 10 parts zeolite pigment to increase gloss.

The coated and calendered paperboard samples were printed on a GMS Flexo Print Proofer. Ink density was measured with an X-Rite densitometer. Ink density for all samples was in the range of 2.2–2.3; a density change of 2.0 points is considered significant. There is no apparent change in ink density with increasing amounts of zeolite pigment substitution. This is important in that the coated surface with the addition of zeolite pigment allows for increased absorptivity of the ink vehicle without absorbing the ink pigment into the sheet. These results are also an indication that inclusion of the zeolite pigment would be useful in improving water-based gravure printing quality.

Due to increasing postage and handling costs, the basis weight of newsprint and other uncoated groundwood printing papers continues to be reduced. At the same time, newspapers are doing more color process printing. The thinner sheets are unfortunately prone to print-through. Use of a porous filler pigment cannot only help to reduce print-through, but can also increase opacity. Newsprint is made at acid pH which prevents the use of calcium carbonate for this application since it provides too alkaline of an environment. Calcined clay works in preventing print-through, but it is difficult to retain and is also abrasive. The current products of choice are lower grade silicas and precipitated silicates, but the use of the products is not cost effective. The zeolite pigment of the present invention is not only nonabrasive, but also cost-effective.

Pilot paper machine trials were run comparing the use of the zeolite of the present invention to precipitated calcium carbonate (PCC) as filler. The trials showed significant advantages of the present zeolite pigment as filler. These pilot machine filler trials were run without use of retention aid polymers. It was found that the filler retention for the present zeolite was 2.5 to 4 times as high as PCC which facilitates running a cleaner wet end with improved sheet formation and uniform optical properties. The significantly higher retention achieved with the zeolite of the present invention is an indication that it can perform well as a substitute for silica in microparticulate retention systems. Silicas currently used in this application are not cost effective. The improved retention of the zeolite pigment is an indication that it would be useful as an alternative to costly silica as a deinking aid.

In addition, porosity tests showed that the present zeolite produced a more open sheet, which would facilitate the use of this pigment in specialty gas filtration papers and anti-tarnish papers. It was also found that the zeolite pigment of the present invention produced papers that had higher tensile strength and tensile energy absorption or stretch. Papers filled with the present zeolite also had a higher coefficient of friction, which decreases the likelihood of misfeed and jams in copiers and also improves performance in converting equipment and print shops. The zeolite of the present invention can also be useful as a frictionizer for coefficient of friction control in recycled linerboard.

The capability of the zeolite pigment to reduce print-through was evaluated by printing samples from the pilot paper machine trials on a proof press and visually inspecting them for evidence of print show-through. The control sample with no filler showed severe print-through. The sample filled with 100 pounds of zeolite pigment (4.59% measured ash content) showed no evidence of print-through. Samples filled with PCC at levels up to 250 pounds per ton showed little improvement over the unfilled control with regard to print-through. The superior performance of the zeolite pigment in minimizing print-through is an indication that it would be useful in production of ultra lightweight-coated publication papers.

A short pigmented size press coating trial was performed during the pilot paper machine run. The zeolite of the present invention was formulated in a 2:1 ratio with size press starch and applied via conventional pond size press. Runnability was good and the sheet was free from dusting. Samples of the pigmented size press coated paper were printed on the three ink jet printers. This preliminary trial work showed that the zeolite of the present invention can be used as pigment for size press coating.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

What is claimed is:

1. A purified natural zeolite pigment composition comprising a zeolite pigment selected from the family Heulandite and having a BET surface area in the range of about 40–50 $m^2/g$, whereby said composition is used for coating and/or filling paper to achieve a coating solids percentage of at least 36%.

2. The purified natural zeolite pigment composition of claim 1 wherein said zeolite pigment is clinoptilolite.

3. The purified natural zeolite pigment composition of claim 2 wherein said composition is used for coating paper to improve the flexographic and/or ink jet printing properties of the paper, said composition further comprising at least one binder and a polymeric dispersing agent.

4. The purified natural zeolite pigment composition of claim 3 wherein said binder is selected from the group consisting of acetate latex, styrene-butadiene, acetate-acrylate, vinyl acrylic, acrylic latexes, and polyvinyl alcohol.

5. The purified natural zeolite pigment composition of claim 4 wherein said polymeric dispersing agent is selected from the group consisting of polyacrylate dispersant, poly-dimethyl-diallyl ammonium chloride, and 2-amino, 2-methyl, 1-propanol.

6. The purified natural zeolite pigment composition of claim 5 further comprising a cobinder, wherein said cobinder is selected from the group consisting of polyvinyl pyrolidone and starch.

7. The purified natural zeolite pigment composition of claim 6 further comprising an optical brightener.

8. The purified natural zeolite pigment composition of claim 5, said composition further comprising an insolubilizer; a lubricant; and an alkali.

9. The purified natural zeolite pigment composition of claim 8 wherein said lubricant is selected from the group consisting of calcium stearate, polyethylene dispersions, lecithin oleate, aliphatic esters, and polyglycerides.

10. The purified natural zeolite pigment composition of claim 9 wherein said insolubilizer is selected from the group consisting of ammonium zirconium carbonate, glyoxal, glyoxalated resins, melamine formaldehyde, and urea formaldehyde.

11. The purified natural zeolite pigment composition of claim 10 wherein said polymeric dispersing agent is selected from the group consisting of polyacrylate dispersant, poly-dimethyl-diallyl ammonium chloride, and 2-amino, 2-methyl, 1-propanol.

12. The purified natural zeolite pigment composition of claim 11 wherein said alkali is selected from the group consisting of ammonia and sodium hydroxide.

* * * * *